(No Model.)

K. RAAB.
ELECTRIC METER.

No. 388,583. Patented Aug. 28, 1888.

Witnesses.
A. Ridout
W. D. Porter

Inventor,
Karl Raab.
By WHN Attorney
Herbert W. T. Jenner.

N. PETERS, Photo-Lithographer, Washington, D. C.

UNITED STATES PATENT OFFICE.

KARL RAAB, OF KAISERSLAUTERN, BAVARIA, GERMANY.

ELECTRIC METER.

SPECIFICATION forming part of Letters Patent No. 388,583, dated August 28, 1888.

Application filed February 27, 1888. Serial No. 265,505. (No model.)

*To all whom it may concern:*

Be it known that I, KARL RAAB, engineer, a subject of the King of Bavaria, residing at the city of Kaiserslautern, in the Kingdom of Bavaria and German Empire, have invented certain new and useful Improvements in Electric Meters; and I do hereby declare the following to be a full, clear, and exact description of the invention, such as will enable others skilled in the art to which it appertains to make and use the same.

This invention relates to a device for measuring the amount of electricity passing through a line-wire, and it is intended for use where a number of electrical devices—such as arc or incandescent lamps—are supplied from a central station to measure the amount of electricity consumed by each.

This invention consists in the novel construction and combination of the parts, hereinafter fully described and claimed, whereby the electricity is passed through a conductor which offers a small resistance, and the heat thus generated in the conductor is caused to produce a current of air, which actuates the vanes of an anemometer provided with a counter for registering the number of its revolutions.

Figure 1:
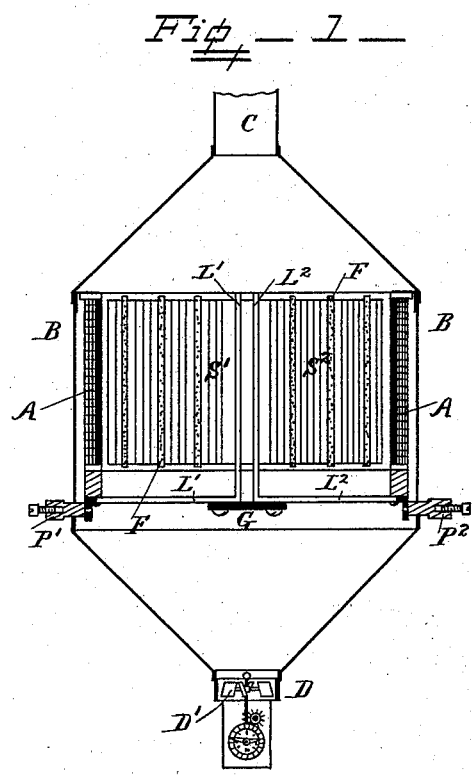
Figure 2:
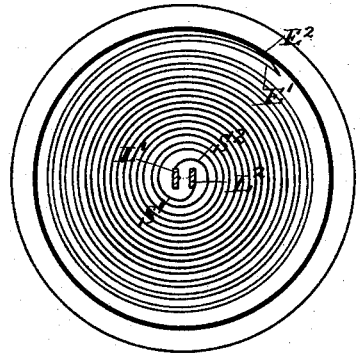

In the drawings, Figure 1 is a vertical section through the electric meter. Fig. 2 is a cross-section through the same.

B is a casing which incloses the device, and which is made of a bad conductor of heat; or it may be provided with a felt or other cover to prevent the passage of heat through it.

C is the air-discharge pipe at the top of the casing, and D is the inlet-pipe for cold air at the bottom of the casing.

D′ is an anemometer of any approved construction, used for measuring a current of air. This anemometer is placed in the inlet-pipe D, and is provided with a counter, which registers the number of revolutions made by the revolving vane.

S′ and S² are two spiral coils of German silver or other material which offers a small resistance to the passage of electricity. These coils are of great length and breadth, but very thin. The outer ends, E′, E², of the coils are soldered together, and the inner ends are connected to the brackets L′ L². The coils encircle each other, and are placed at a uniform distance apart, the spacing being preserved by inserting pieces of asbestus, F, or other similar material between them.

G is a plate of non-conducting material, which connects the lower portions of the brackets L′ L² and keeps them in position.

P′ and P² are binding-screws for connecting the line-wire to the brackets L′ and L², respectively. The current enters through the binding screw P′, traverses the bracket L′ and coil S′, thence passes through the connected outer ends, E′ E², into the coil S², through the bracket L², and out by the binding-screw P². The heat generated in the coils expands the air in the casing, which rises and escapes by pipe C, and the anemometer is revolved by the incoming cold air, which enters through pipe D. The parts of the coils which join onto the brackets may be made of copper, which material offers less resistance than German silver, and does not become so hot. The object of this is to avoid heating the brackets.

When the current of air is not great enough to overcome the friction of the anemometer, the electric current is very weak indeed, because the heat generated by it is inversely proportional to the square of the current. In the case of an electric-light current this evil may, however, be remedied as follows:

A is a shunt, which consists of a cylinder formed of a material which offers a high resistance. This may be used simultaneously with the coil, and the heat engendered by it will be sufficient to keep the anemometer in constant very slow rotation. In this case the revolutions caused by the shunt must be allowed for and deducted from the total to ascertain the amount of electricity consumed. If the source of constant heat should be so proportioned as to produce an air-current which will nearly move the anemometer, so that the latter commences to act immediately the variable source of heat comes into operation, the deduction above-mentioned need not be made.

The electric current can be measured by two of the above-described instruments by substituting the shunt-cylinder A of high-resistance material for the coils in one instrument, which will then register the volts, while the other instrument measures the coulombs.

What I claim is—

1. In an electric meter, the combination of an inclosing-case, two spiral coils of German silver encircling each other, with their similar ends connected together, and with their similar opposite ends connected to the line-wire, so that the current must pass through and heat the coils, and an anemometer operated by the current of air formed by the heat of the coils within the case.

2. In an electric meter, the combination of an inclosing-case, two spiral coils of small-resistance material encircling each other and connected together and to the line-wire, so that the current must pass through and heat the said coils, and an anemometer operated by the air-current induced by the said heated coils.

3. In an electric meter, the combination of an inclosing-case, two spiral coils of small-resistance material encircling each other and connected together and to the line-wire, so that the current must pass through and heat the said coils, a shunt of conducting material having greater resistance than the spiral coils, and also included in the circuit, and an anemometer operated by the current induced by the said heated coils, substantially as and for the purpose set forth.

In testimony whereof I affix my signature in presence of two witnesses.

KARL RAAB.

Witnesses:
B. ROI.
MARC M. ROTTEN.